United States Patent [19]
Jaklitsch et al.

[11] Patent Number: 5,914,781
[45] Date of Patent: Jun. 22, 1999

[54] METHOD FOR STABILIZING THE PHASE MODULATOR TRANSFER FUNCTION IN CLOSED LOOP INTERFEROMETRIC FIBER OPTIC GYROSCOPES

[75] Inventors: James Joseph Jaklitsch, Parkton, Md.; Jay Michael Markey, York, Pa.

[73] Assignee: AAI Corporation, Cockeysville, Md.

[21] Appl. No.: 09/002,085

[22] Filed: Dec. 31, 1997

[51] Int. Cl.$^6$ ................................................. G01C 19/72
[52] U.S. Cl. ............................................................ 356/350
[58] Field of Search .............................................. 356/350

[56] References Cited

U.S. PATENT DOCUMENTS

4,998,822  3/1991  Steele ........................................ 356/350

Primary Examiner—Samuel A. Turner
Attorney, Agent, or Firm—Venable, Baetjer, Howard & Civiletti, LLP

[57] ABSTRACT

This invention relates to an improved method and mechanism for eliminating acceleration-dependent errors and loop interaction effects in gain-stabilized, closed-loop, interferometric fiber optic gyroscopes. Such method and mechanism include enabling the modulation gain accumulator and disabling the rate accumulator on every occurrence of ramp flyback if the gyroscope is operating below a certain velocity threshold and enabling the modulation gain accumulator and disabling the rate accumulator on one out of every N occurrences of ramp flyback if the gyroscope is operating above a certain velocity threshold. Such method and mechanism also includes use of proportional circuitry to scale the magnitude of the bias modulation component to be a percentage of the serrodyne ramp voltage and the DC component to be zero volts.

45 Claims, 6 Drawing Sheets

METHOD FOR STABILIZING THE PHASE MODULATOR TRANSFER FUNCTION IN CLOSED LOOP INTERFEROMETRIC FIBER OPTIC GYROSCOPES

CROSS REFERENCE TO RELATED APPLICATIONS

This application is related to "Fixed Interval Background Auto-Alignment For Closed Loop Interferometric Fiber Optic Gyroscopes" application Ser. No. 09/002,086 filed Dec. 31, 1997 by James Joseph Jaklitsch and Jay Michael Markey, commonly owned, and incorporated herein by reference.

BACKGROUND OF THE INVENTION

Figure 1:
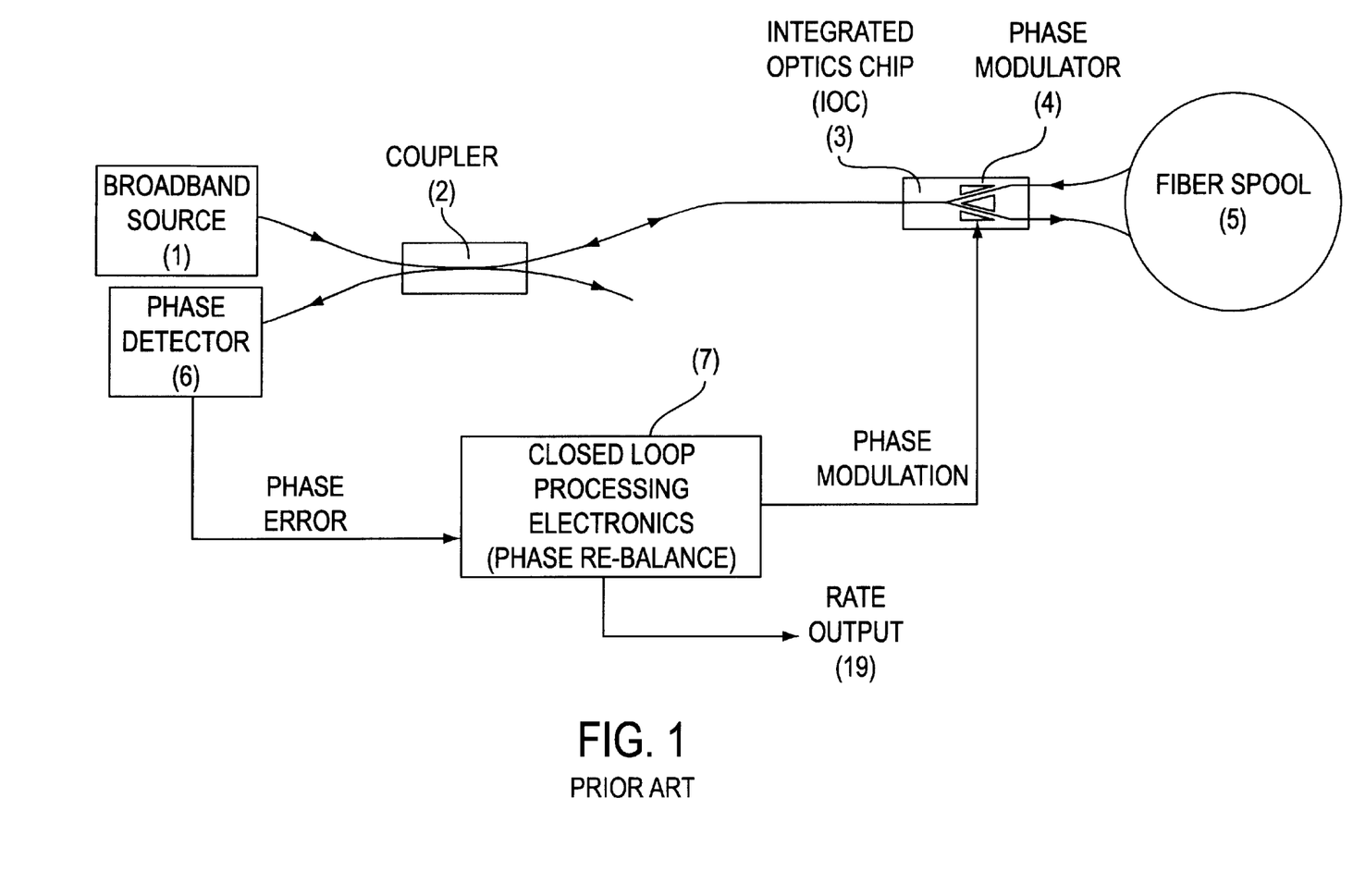
FIG. 1 is a basic block diagram of a closed loop interferometric fiber optic gyroscope.

The present invention relates to an improved means for aligning a closed loop interferometric fiber optic gyroscope. Fiber optic gyroscopes are used to sense rotation. Closed loop interferometric fiber optic gyroscopes (IFOGs) sense angular rate by propagating light in counter-rotating directions around a fiber optic spool as shown in FIG. 1. The fiber optic spool is wound around the axis in which rotation is to be sensed. A broadband light source (1) injects light through a coupler (2), into an integrated optics chip (IOC) (3). In the IOC, the light is split into two paths and injected in counter-rotating directions through the fiber spool (5). The optical fiber has a typical length of 100 to 2,000 meters. Rotation of the fiber optic spool around the axis in which rotation is to be sensed causes an effective optical path length increase in one direction with a corresponding path length decrease in the other direction. Consequently, the light propagating through the fiber spool is shifted in phase in accordance with a phenomena known as the Sagnac Effect. The light wave traveling in the rotation direction acquires a phase lead, while the opposite traveling wave acquires a phase lag. The composite phase shift is proportional to the rotation rate that is desired to be measured. Small rotation rates produce small phase shifts, while large rotation rates produce large phase shifts. The light wave is then routed back through the IOC (3) and the coupler (2) to an interferometric phase detector. The counter-rotating light beams produce an optical interference pattern at the phase detector (6), with phase proportional to the rotation rate of the fiber spool (5).

Figure 3A:
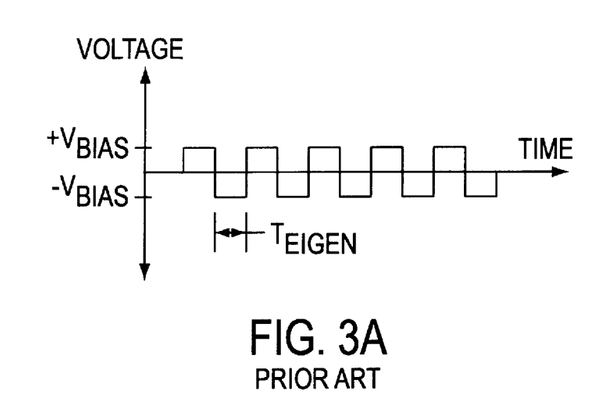
Figure 3B:
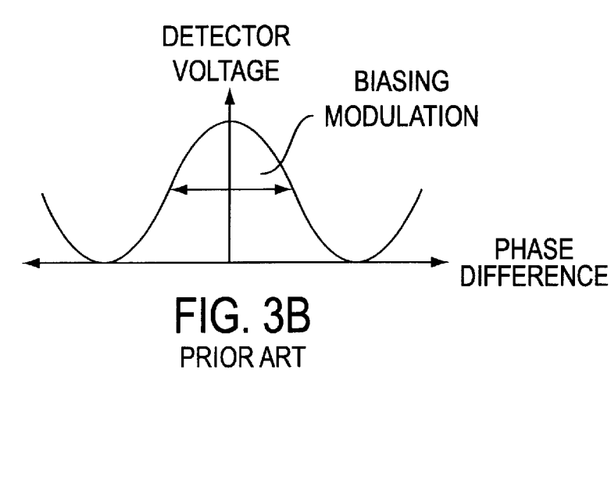

As shown in FIG. 3(b), the interference pattern at the phase detector follows a raised-cosine pattern. This interference pattern is caused by the difference in phase of the two light waves. The difference in phase is proportional to the rotation rate. That is, the output of the phase detector is proportional to the cosine of the phase difference between the two light waves. Consequently, the phase detector output has a small slope at small phase differences, small phase differences correspond to small rates of rotation. This means that the rate of change of the cosine function near zero will be very small. As a result, the output function provides very low sensitivity for low rotation rates.

Therefore, it is desirable to move the operating point of the phase detector from 0° to ±90° (±Π/2 Rad), where the detector has high sensitivity. This is accomplished by adding a phase shift to one of the light waves. That is the function of the phase modulator (4). The phase modulator (4) (see, e.g., FIG. 2) is a serrodyne device that generates a phase shift proportional to the change in applied voltage at its input. The applied voltage is the sum of the voltage produced by the bias modulator and the serrodyne ramp generator.

The purpose of the biasing modulator is shown in FIG. 3(b). It is used to shift the voltage sampling point out to approximately ±90° (±Π/2 Rad) where the voltage slope is maximized and, consequently, the sensitivity of the modulator is maximized. This allows the phase of the interference pattern to be accurately computed by differencing the voltage measured at the positive and negative bias points (which equals the slope of the raised-cosine curve at Π/2 Rad). Therefore, small variations in rotation rate can be accurately detected and will vary linearly since the slope of the curve around ±Π/2 Rad is linear.

The biasing modulator delays one of the waves by Π/2 Rad with respect to the other. It does this by adding or subtracting a voltage corresponding to Π/2 to the input of the phase modulator (4). As a result, the detector has its maximum sensitivity for low rotation rates. In addition, this sensitivity is close to being linear.

However, as the rotation rate increases, the response of the detector moves away from Π/2, where the curve becomes less and less linear. In addition, the curve's slope flattens, thereby reducing the detector's sensitivity.

Therefore, a second modulation component is added. The other modulation component is the serrodyne ramp modulator, which applies the phase shift necessary to hold the gyro in a rebalanced condition. It provides sufficient phase change so as to cancel the phase shift difference generated by the opposite traveling light waves due to rotation.

Figure 3C:
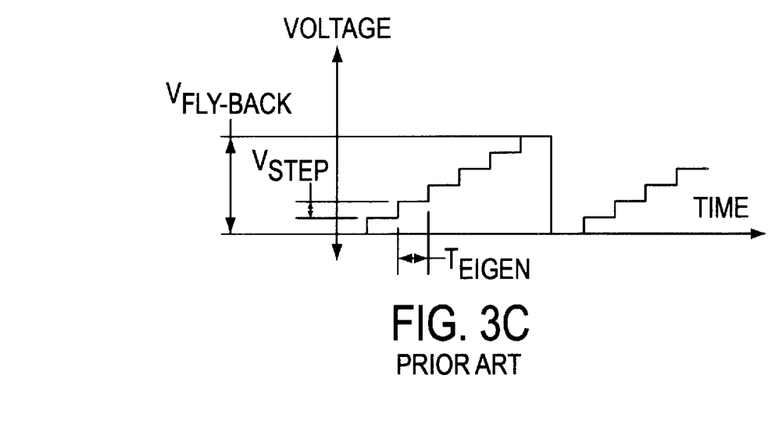

As shown in FIG. 3(c), in order to apply a constant phase offset, the control voltage input to the phase modulator (4) must be applied as a stepped ramp which changes, each Eigen period, by an amount proportional to the desired phase shift. Since the required re-balance phase shift can be large or small, positive or negative, depending on the gyroscope's motion, the stepped ramp is correspondingly fast or slow, increasing or decreasing, as required to produce the phase shift needed to rebalance the gyroscope.

The ramp can not increase indefinitely and, at some point, must fly-back to zero. The flyback is made transparent to the gyroscope's phase modulator (4) by scaling the magnitude of the flyback voltage to correspond to the desired step size plus or minus 360° (step size ±2Π Rad). This produces the same phase shift during the fly-back as is produced by the other voltage steps in the ramp, effectively making a continuous phase shift.

Figure 3D:
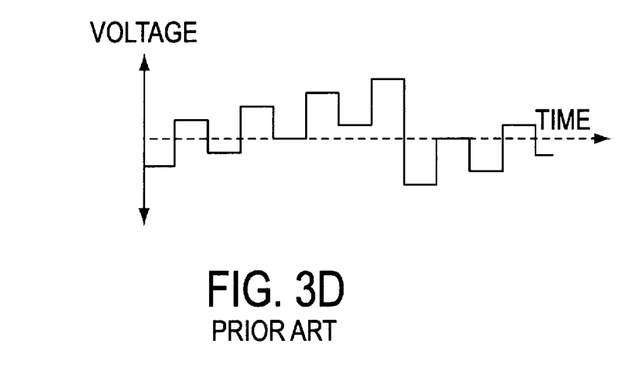

The composite phase modulation signal is illustrated in FIG. 3(d). This signal is the sum of the biasing modulation (a) and the serrodyne ramp modulation (c).

Therefore, closed loop operation is obtained by measuring the detector phase (6) and driving a matching phase shift into an electro-optic phase modulator (4), thus re-balancing (i.e., zeroing) the detected phase shift.

Figure 2:
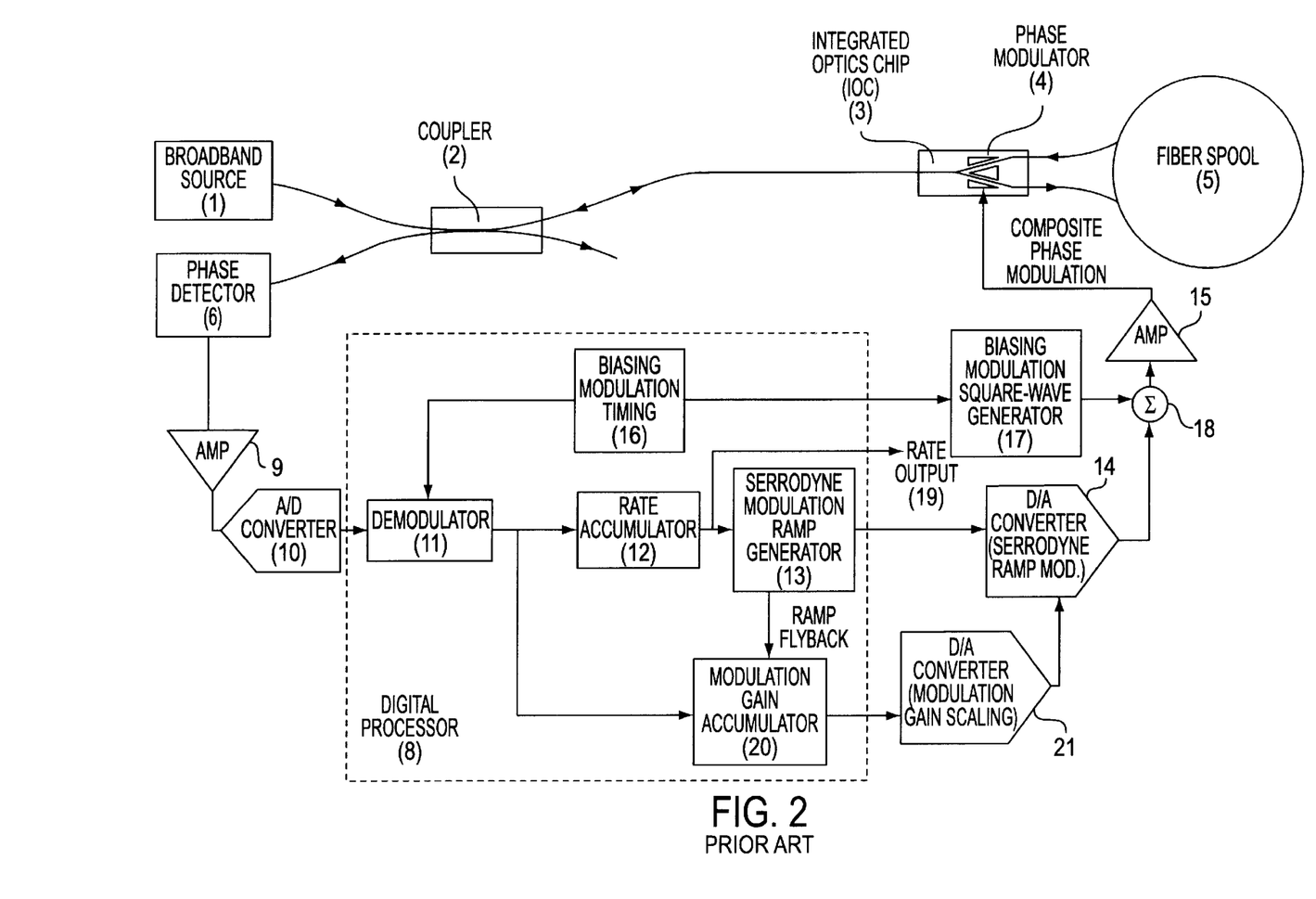
FIG. 2 is a block diagram of existing prior art for closed loop interferometric fiber optic gyroscopes.

The phase shift necessary to hold the gyroscope in a rebalanced condition is directly proportional to angular velocity of the fiber spool, and the processing electronics (7) derive the rate output (19) of the gyroscope from the commanded phase shift. FIG. 2 illustrates the best prior art for the closed loop processing electronics (7). The phase detector (6) output (which in a preferred embodiment is an analog square wave) is first amplified (9) and then digitized with an A/D converter (10). The digitized output of the A/D converter is a modulated signal, which is de-modulated (11) to recover the detector phase error. (In a preferred embodiment the demodulator (11) is a square wave detector). The phase error is then integrated in a digital accumulator (12) or integrator to compute the present gyro rate. The output from the accumulator or integrator (12) corresponds to the rotational rate of the gyroscope and drives both a serrodyne modulated ramp generator (13), and the gyroscope rate output (19).

The serrodyne modulation ramp generator (13) produces a stepped digital waveform in which the step size corresponds to the amount of phase shift required to hold the phase detector (6) output at null (gyroscope phase held in a re-balanced condition). The digital output of the ramp generator (13) corresponds to the rotational rate of the gyro and is converted to a stepped analog voltage ramp by a D/A converter (14). The voltage ramp is summed (18) with a biasing modulation voltage to form a composite phase modulation signal, which is amplified (15) and used to drive the phase modulator (4). The phase modulator adds a phase shift to one of the light waves to re-balance the gyro for closed loop operation.

In a preferred embodiment, the biasing modulation voltage is generated with a square wave generator (17), which is slaved to the same bias modulation timing (16) that provides a reference to the demodulator (11).

The components of the composite phase modulation signal are illustrated in FIG. 3. As shown in FIG. 3(a), in a preferred embodiment, the biasing modulation is a square wave, switched at the gyro Eigen period. The Eigen period is simply the time required for light to propagate around the fiber spool.

Since the commanded re-balance phase shift is the gyroscope output, the linearity and stability of the transfer function between the digital phase command at the ramp generator (13) and the actual phase shift produced by the modulator (4), directly impacts gyro performance. In order to produce a high performance IFO gyroscope, this phase command transfer function must be held stable despite changes in environmental factors such as temperature, humidity, power supply voltage, etc.

The present state-of-the-art for stabilizing the phase command transfer function is embodied in a technique that utilizes a gain scaling control loop to regulate the transfer function and hold it constant despite environmental disturbances. This technique consists of regulating the gain of the serrodyne ramp modulation so as to hold the fly-back transition equal to exactly ±360° (plus the appropriate phase step for re-balance).

As shown in FIG. 2, the D/A converter (14) for the serrodyne ramp modulator has its gain controlled by a separate modulation gain-scaling D/A converter (21). This D/A (21) scales the magnitude of the serrodyne ramp and can scale the ramp magnitude such that the ramp Fly-back voltage produces either greater or lesser than 360° of phase shift at the phase modulator (4).

The gain-scaling D/A (21) is controlled by a modulation gain accumulator (20) which accumulates the phase error (6,9,10,11) produced when ramp flyback occurs. The modulation gain accumulator (20) is normally held at its accumulated value, and is enabled to run only when the ramp generator (13) signals that a ramp flyback is about to occur. Once enabled, it samples phase error (output of demodulator (11)) for two Eigen periods, so that both phases of biasing modulation are accumulated.

The gain scaling control loop formed by the modulation gain accumulator (20) and the modulation gain-scaling D/A (21) operates to stabilize the phase command transfer function by adjusting the gain of the serrodyne ramp modulation D/A (14) until the phase error measured during a fly-back event is zero, which corresponds to a phase shift of ±360°. If the gain (20,21) is slightly in error, then the fly-back phase shift will not be precisely ±360°, and a non-zero phase error will be accumulated (20). This corrects the ramp magnitude (21,14), driving it to a balanced condition in which the ramp flyback is forced to a precise ±360°.

LIMITATIONS OF PRIOR ART

There are several significant error sources in the prior art technique of using a gain-scaling control loop to stabilize the phase command transfer function. These include: (1) loop interactions (acceleration-dependent errors); and (2) non-constant relation between serrodyne and biasing modulation.

The prior art allows the phase-rebalance control loop to run simultaneously with the gain-scaling control loop. Normally, the phase-rebalance control loop is active, accumulating measured phase error in the rate accumulator (12) while the gain-scaling control loop is disabled, with the gain accumulator (20) held at its previous value. This allows the gyroscope to be actively rebalanced while the modulation gain (20,21) is held static.

When a ramp fly-back condition occurs, however, the gain accumulator (20) is enabled and the measured phase error is accumulated into both the rate accumulator (12) and the gain accumulator. When this happens, both the phase-rebalance control loop and the gain scaling control loop attempt to provide corrections based on the measured phase error. If the gyroscope acceleration is very low (phase error near zero), this may not be a significant error. When the acceleration increases, however, the phase error is non-zero and both loops attempt to correct simultaneously. This produces instabilities and interactions between the loops that dissolve into chaotic, random behavior as the gyro is accelerated rapidly. The net effect is acceleration-dependent errors that prevent the gyro from operating reliably under conditions of non-constant velocity.

Another error source in the prior art is caused by holding the magnitude of the biasing modulation fixed while the serrodyne ramp modulation is adjusted by the gain scaling control loop. This causes the equivalent phase of the biasing modulation to change with respect to the equivalent phase of the serrodyne ramp modulation. In addition, the DC offset component of the serrodyne ramp can change as the gain scaling D/A (21) is changed. Both of these effects contribute parasitic error terms that tend to degrade stability and linearity.

SUMMARY OF THE INVENTION

It is an object of the present invention to improve the performance of high quality fiber optic gyroscopes by eliminating acceleration-dependent errors caused by interaction of the phase re-balance and gain scaling control loops, and to eliminate parasitic errors caused by changes in the relative magnitudes of the three components of the composite phase modulation signal.

It is an another object of the present invention to disclose a method of eliminating acceleration-dependent errors and loop interaction effects in gain-stabilized, closed loop, interferometric fiber optic gyroscopes, said gyroscopes being characterized by having a phase re-balance control loop for closed loop operation, and a separate gain-scaling control loop for stabilizing the phase modulator transfer function.

It is a further object of the present invention to use arbitration logic (22) to provide time-sliced, multiplexed control of said phase re-balance Loop and said gain scaling control loop and, by so doing, eliminate interactions between said loops which cause acceleration-dependent errors.

It is still a further object of the present invention to use arbitration logic (22) to enable either the rate accumulator (12), or the modulation gain accumulator (20), but never both simultaneously.

It is an additional object of the present invention to use arbitration logic (22) to enable the rate accumulator (12), and disable the modulation gain accumulator (20) except during occurrences of a ramp flyback condition.

It is still another additional object of the present invention to use arbitration logic (22) to enable the modulation gain accumulator (20), and disable the rate accumulator (12), on every occurrence of a ramp flyback condition when the gyroscope is operating below a certain velocity threshold, and to enable the modulation gain accumulator (20), and disable the rate accumulator (12), on every one out of N occurrences of a ramp flyback condition when the gyroscope is operating above a certain velocity threshold.

It is still a further object of the present invention to disclose a method for improving linearity and stability of gain-stabilized, closed loop, interferometric fiber optic gyroscopes, said gyroscopes being characterized by having a phase re-balance control loop for closed loop operation, and a separate gain-scaling control loop for stabilizing the phase modulator transfer function. Said method is comprised of using proportional compensation circuitry to maintain an exact proportional relation between the three principal components of the composite phase modulation signal, said principal components consisting of serrodyne ramp, biasing modulation and DC offset.

It is still another additional object of the present invention to use proportional compensation circuitry to adjust the magnitude of the biasing modulation signal component so as to maintain said magnitude at a constant proportion (approximately 25%) of the magnitude of the serrodyne ramp component as the magnitude of said serrodyne ramp component is adjusted by said gain scaling control loop.

It is still a further object of the present invention to use proportional compensation circuitry to force the DC offset component of the DC-coupled composite modulating wave form to zero and maintain said DC component at zero magnitude as the magnitude of the serrodyne ramp component is adjusted by said control loop.

It is another additional object of the present invention to provide an alternate method for improving linearity and stability of gain-stabilized, closed loop, interferometric fiber optic gyroscopes, said gyroscopes being characterized by having a phase re-balance control loop for closed loop operation, and a separate gain-scaling control loop for stabilizing the phase modulator transfer function. Said alternate method is comprised of using digital or analog circuitry to construct a scaled composite modulating waveform, said waveform consisting of a serrodyne ramp component of unit magnitude, a biasing modulation component at approximately 25% fixed relative magnitude, and a DC component of zero; and using a variable gain linear amplifier (15) to adjust the magnitude of the composite modulating signal, while holding a fixed relation between the signal components, under control of a gain-scaling control loop in accordance with existing art.

BRIEF DESCRIPTION OF THE DRAWINGS

FIG. 3a–d show the components of a composite phase modulation signal;

DETAILED DESCRIPTION OF THE INVENTION

Figure 4:
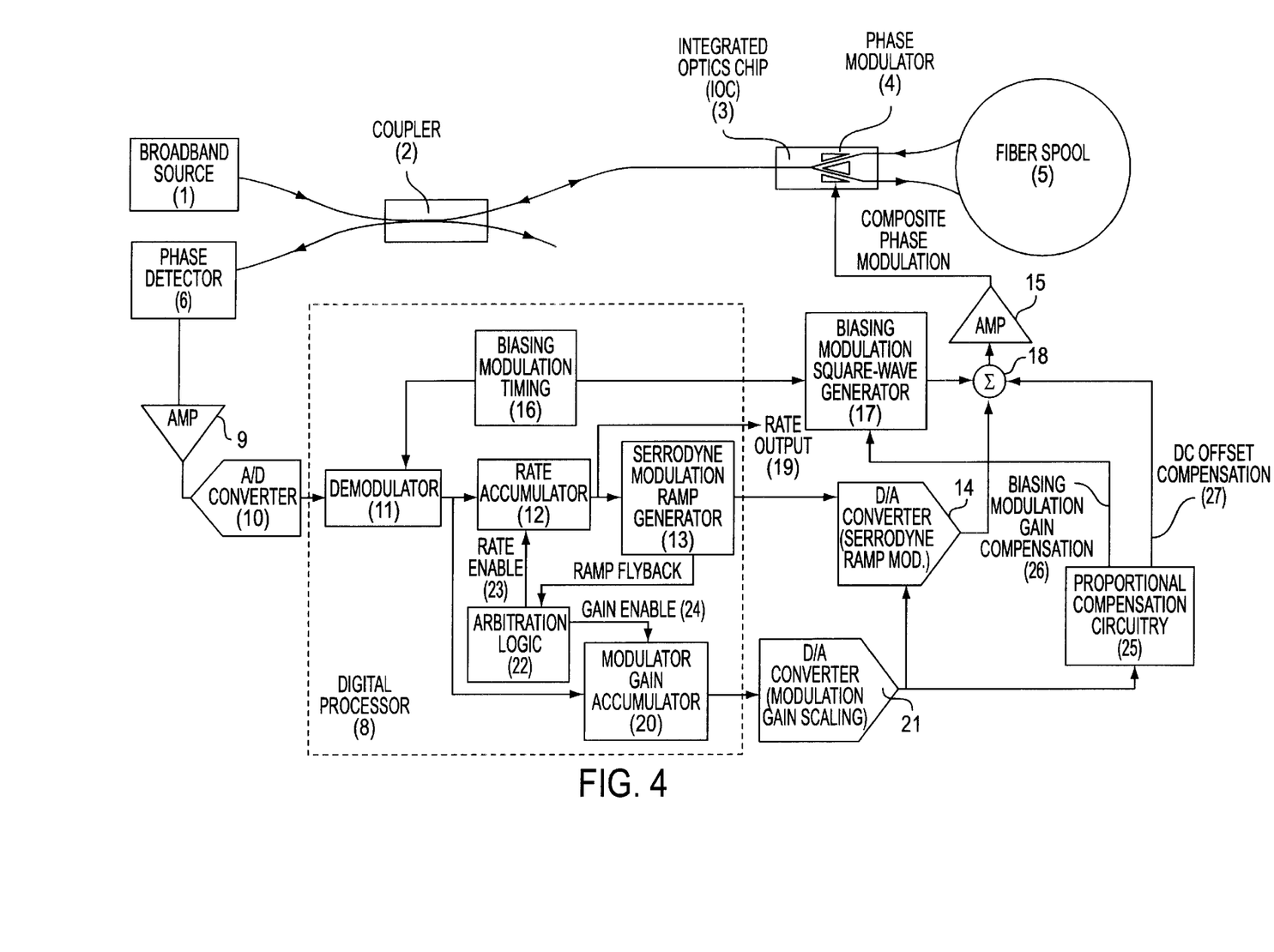
FIG. 4 shows the improvements made to the existing prior art by the invention.

The improvements to prior art are highlighted in FIG. 4. Arbitration logic (22) provides time-slice multiplexing between the rate accumulator (12) and the modulation gain accumulator (24), enabling one or the other (23,24), but never both simultaneously. Except during occurrences of a ramp flyback condition, the rate accumulator (12) is enabled (23), accumulating phase error and driving the serrodyne ramp generator (13) with a commanded phase shift as necessary to hold the gyroscope in a re-balanced condition.

When a ramp flyback condition is reported by the serrodyne ramp generator (13), the arbitration logic (22) response depends on the gyroscope angular rate. If the gyroscope rate is below a certain threshold (7.5°/sec in a preferred embodiment), the arbitration logic (22) disables (23) the rate accumulator (12) and enables (24) the modulation gain accumulator (20) for two Eigen periods, thus allowing the gain scaling control loop to adjust without interacting with the phase rebalance control loop.

If the gyroscope rate is above the threshold, the arbitration logic allows the rate accumulator (12) to remain enabled (23) for most of the ramp flyback events, disabling the rate accumulator (12) and enabling the modulation gain accumulator (20) on a one out of N basis, where N is 8 in a preferred embodiment. This action ensures the gyroscope remains stable and rebalanced at high rates, in which the ramp flyback event can occur as frequently as every two Eigen periods. In other embodiments, the rate accumulator is disabled and the modulation gain accumulator is enabled over a range from one out of every four flybacks to one out of every sixteen flybacks.

Figure 5:
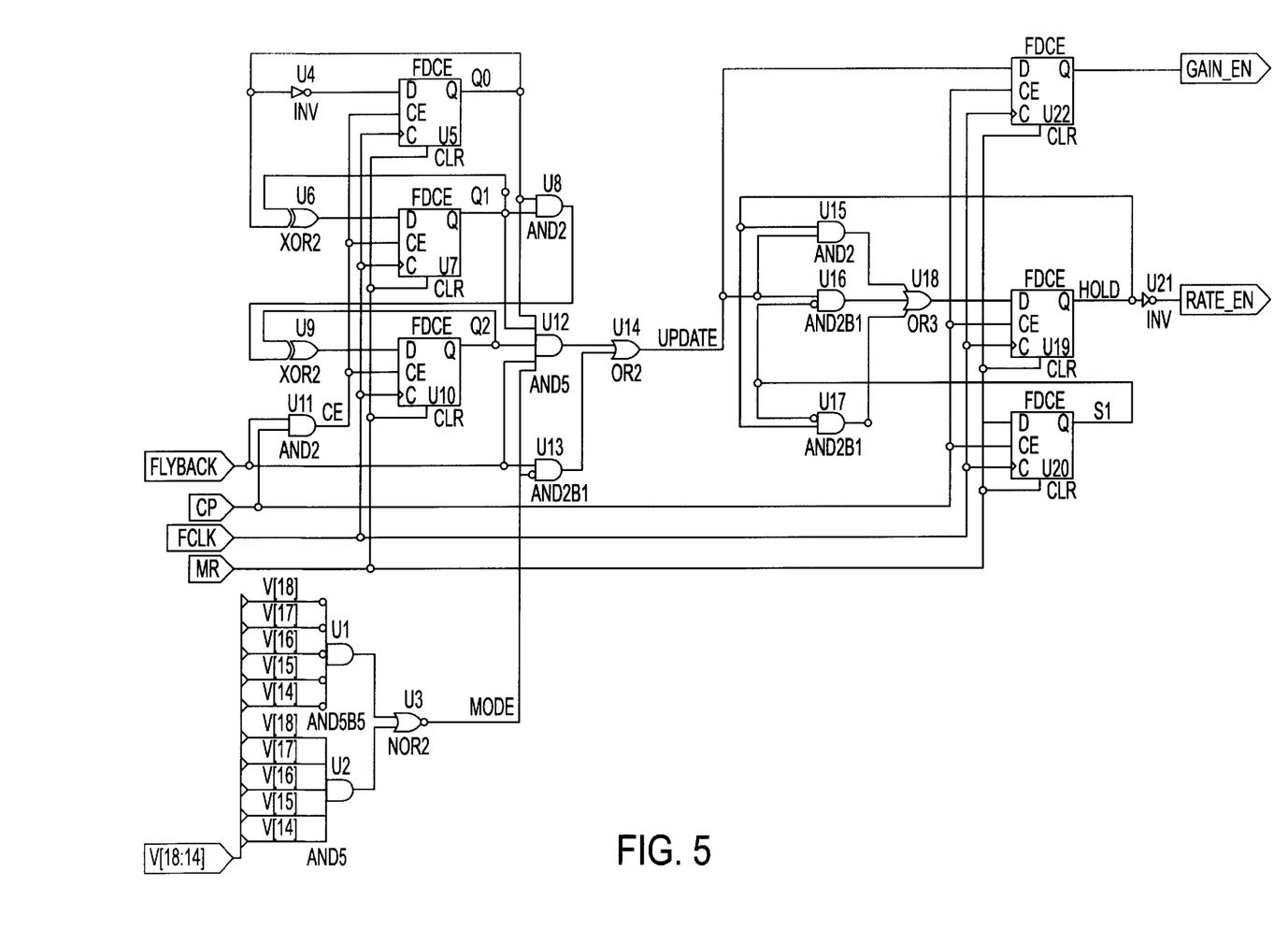
FIG. 5 is a detailed schematic of the arbitration logic.

A detailed schematic of the arbitration logic is shown in FIG. 5. U1, U2, and U3 generate the MODE signal as a function of the velocity input V[18:14]. In a preferred embodiment, V[18:14] is a two-s-complement value where V14 represents 7.5°/sec. When the velocity is positive (V18 is logic low) U1 will go active only if the velocity is below 7.5°/sec. When the velocity is negative (V18 is logic high) U2 will go active only if the velocity is below −7.5°/sec. Thereby, the MODE signal will be logic low if the velocity is below 7.5°/sec or greater. In other embodiments, the threshold can be as high as 30°/sec.

In a preferred embodiment, U4–U10 is a divide-by-8 up counter. It is incremented during every flyback (controlled by U11). U12, U13, and U14 form a 2-to-1 multiplexer that is controlled by the MODE signal. When MODE is logic low, U13 will force the UPDATE signal active during every flyback. When MODE is logic high, U12 will force the UPDATE signal active only when the divide-by-8 counter is at state 7 (Q2=Q1=Q0=high), thus UPDATE is active only one out of every eight flybacks. In other embodiments, the UPDATE signal is active from one out of every four flybacks to one out of every sixteen flybacks. The UPDATE signal represents a modulator gain accumulator update cycle.

U15–U20 is a state machine that generates the HOLD signal during every update. The HOLD signal is used to hold the value of the RATE accumulator constant while the modulator gain accumulator is updated. HOLD is active for a fully modulation period to avoid accumulating a DC bias error. U21 inverts the HOLD signal to create the rate accumulator enable signal. U22 synchronizes the modulator gain accumulator enable signal (GAIN_EN) with the rate accumulator enable signal (RATE_EN).

Figure 6:
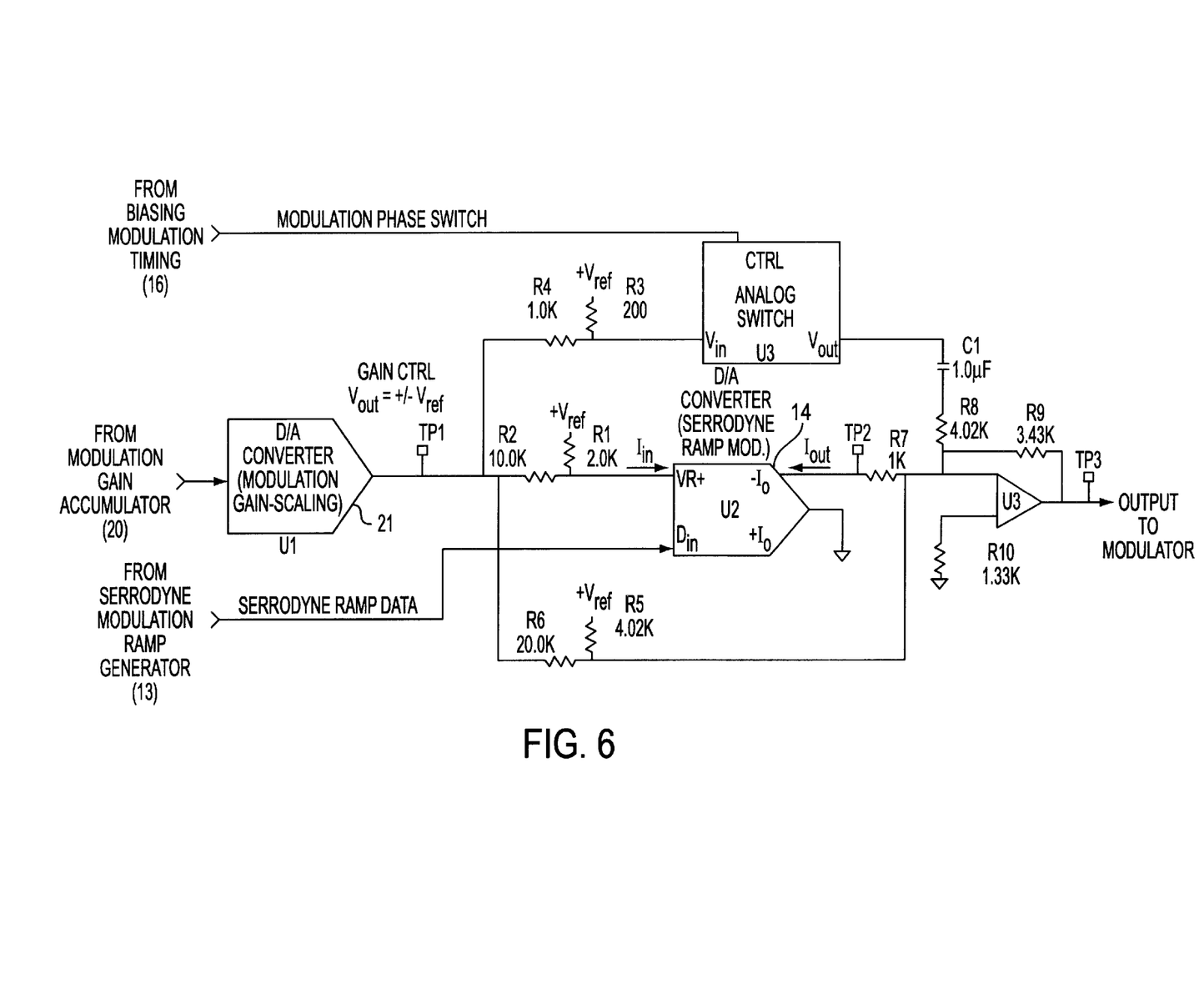
FIG. 6 is a detailed schematic of the proportional compensation circuitry.

Input signal description:
CP—one-clock wide timing pulse used to indicate when valid data has been acquired
FCLK—master clock
FLYBACK—indicates a Serrodyne Modulation Ramp Generator flyback
MR—master reset
V[18:14]—velocity, where, in a preferred embodiment, V14 represents 7.5°/sec
Output signal description:
GAIN_EN—modulator gain accumulator enable
RATE_EN—rate accumulator enable A detailed schematic of the proportional compensation circuitry is shown in FIG. 6. D/A converter U2 produces the serrodyne ramp modulation voltage. The serrodyne ramp data is supplied to U2 as a digital value, and is converted to a stepped analog current. U2 contains an input op-amp stage which holds the voltage at VR+ to zero (virtual ground). The current $I_{in}$ is multiplied by N/256, where N is the digital value of the Ramp data. The current $I_{out}$ is converted to a voltage in output amplifier U3 to produce a stepped voltage ramp at TP3, which is output to the gyroscope's phase modulator (4).

If the voltage at TP1 is zero, $I_{in}$ is established by resistor R1. In the present implementation, $V_{ref}$ is 2.5V, and $I_{in}$ is nominally 1.25 ma. This generates a peak amplitude (ramp magnitude) at TP2 of 1.25 V, which is amplified by a factor of 3.43 in amplifier U3.

D/A converter U1 provides the modulation gain-scaling function by providing, in a preferred embodiment, ±20% trim to the nominal value of $I_{in}$. U1 generates a voltage between ±2.5V ($V_{ref}$) TP1, with zero being the nominal value. When TP1 is zero, the current flow through R2 is zero, since the VR+ input of U2 is a virtual ground. This sets $I_{in}$ to its nominal value of 1.25 ma, as established by R1. As TP1 develops a non-zero voltage the current flow through R2 adds to (or subtracts from) $I_{in}$ to adjust the ramp magnitude. In a preferred embodiment, full scale voltage at TP1 provides a ±20% trim to $I_{in}$ due to the 5:1 ratio between R2 and R1. In other embodiments, full scale voltage at TP1 can provide up to a ±50% trim.

In a preferred embodiment, the resistors R4 & R3 and R6 & R7 have the same 5:1 ratio as R2 and R1, and thus provide the same maximum ±20% trim to the other signal components as the ramp magnitude is adjusted. Resistors R3 & R4 control the magnitude of the biasing modulation, which is developed by switch U3 as a square-wave signal, then AC coupled through C1 to a summing node at amplifier U3. The 4:1 ratio between R8 and R7 sets the magnitude of the biasing modulation to be 25% of the serrodyne ramp modulation (If the Ramp is defined to be 360°, the biasing modulation will be proportionally ±90°). In other embodiments, the magnitude of the biasing modulation is 20% to 30% of the serrodyne ramp modulation.

Resistors R5 & R6 inject a current into the summing node of amplifier U3 to offset the DC bias of the voltage at TP2, and restore the average value of the signal at TP3 to zero volts. The ramp at TP2 runs from zero to nominally 1.25V, with an average value of ½ the peak voltage. The 2:1 ratio between R5 and R1 provides an off-setting current at 50% of the value of $I_{in}$, thus canceling the DC bias at TP2.

Proportional compensation is provided by the matching ratio of resistors R2:R1, R4:R3, and R6:R5. As the serrodyne ramp magnitude is adjusted by a change in voltage at TP1, the magnitude of the biasing modulation and the DC offset compensation are adjusted in exact proportion. This allows the phase shift produced by the serrodyne ramp flyback to be adjusted without injecting spurious effects caused by altering the relative phase significance of the biasing modulation, and without incurring parasitic nonlinearities by allowing the DC offset of the composite modulation signal to change.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What we claim as our invention is:

1. A closed-loop interferometric fiber optic gyroscope, comprising:
   a phase-rebalance control loop which accumulates phase error and outputs a digital signal sufficient to balance out the phase error caused by the rotation of the closed-loop interferometric fiber optic gyroscope during normal operation;
   a gain-scaling control loop which accumulates phase error during alignment of the closed-loop interferometric fiber optic gyroscope;
   an arbitration logic circuit connected and electrically coupled to said phase-rebalance control loop and said gain scaling control loop, whereby only one control loop accumulates phase error at a time, said phase-rebalance control loop accumulates phase error during normal operation and said gain-scaling control loop accumulates phase error during alignment of the closed-loop interferometric fiber optic gyroscope.

2. The gyroscope according to claim 1, in which said arbitration logic circuit disables said phase-rebalance control loop from accumulating phase error and enables said gain-scaling control loop to accumulate phase error.

3. The gyroscope according to claim 2, in which the mode threshold can be up to about 30°/sec.

4. The gyroscope according to claim 1, in which said gain-scaling control loop is enabled for two Eigen periods.

5. The gyroscope according to claim 1, in which said arbitration logic circuit disables said phase-rebalance control loop from accumulating phase error and enables said gain-scaling control loop to accumulate phase error for one out of every N flybacks if the gyro rate is above a certain threshold.

6. The gyroscope according to claim 5, in which N is an integer from 4 to 16.

7. The gyroscope according to claim 5, in which said threshold can be up to about 30°/sec.

8. The gyroscope according to claim 1, in which said arbitration logic circuit disables said phase-rebalance control loop from accumulating phase error and enables said gain-scaling control loop to accumulate phase error for a full modulation period to avoid accumulating a DC bias error.

9. The gyroscope according to claim 1, in which said arbitration logic circuit further comprises:
   a mode signal generator circuit having a velocity input and an output, whereby said mode signal generator circuit generates an Update signal if the velocity is equal to or greater than a certain threshold,
   a divide by N up counter having a flyback input and an output, whereby said divide by N up counter generates an Update signal once every N flybacks, a hold signal generator having two inputs, one of said inputs is connected and electrically coupled to said output of said mode signal generator circuit and the other of said inputs is connected and electrically coupled to said output of said divide by N up counter, whereby said hold signal generator generates a Hold signal during every Update signal which is used to disable said phase-rebalance control loop from accumulating phase error and enable said gain-scaling control loop to accumulate phase error.

10. The gyroscope according to claim 9, in which said threshold can be up to about 30°/sec.

11. The gyroscope according to claim 9, in which said Hold signal disables said phase-rebalance control loop from accumulating phase error and enables said gain-scaling control loop to accumulate phase error for a full modulation period to avoid accumulating a DC bias error.

12. The gyroscope according to claim 1, in which said gyroscope further comprises a proportional compensation circuit.

13. The gyroscope according to claim 12, in which said proportional compensation circuit further comprises:

a biasing modulator having voltage input, a control input, and a voltage output, whereby said output is used to shift the voltage sampling point out to where the voltage slope is maximized;

a first digital to analog converter having a voltage input, a control input, and an output, said voltage input is connected and electrically coupled to said phase-rebalance control loop, whereby said first digital to analog converter outputs an analog voltage equivalent of the digital input;

a second digital to analog converter having a voltage input and an output, said voltage input is connected and electrically coupled to said gain-scaling control loop and said output is connected and electrically coupled to said control input of said first digital to analog converter, whereby said second digital to analog converter adjusts the value output by said first digital to analog converter;

a summer having two inputs and one output, one of said inputs is connected and electrically coupled to the output of said first digital to analog converter and the other of said inputs is connected and electrically coupled to said output of said biasing modulator.

14. The gyroscope according to claim 13, in which said biasing modulator is a switch.

15. The gyroscope according to claim 13, in which said biasing modulator further comprises a resistive input to adjust said magnitude of said bias modulation signal.

16. The gyroscope according to claim 15, in which said biasing modulator further comprises a resistive input to adjust said magnitude of said bias modulation signal by up to ±50%.

17. The gyroscope according to claim 13, in which said first digital to analog converter further comprises an input op amp stage connected and electrically coupled to said output of said second digital to analog converter, whereby said second digital to analog converter can adjust the output of said first digital to analog converter.

18. The gyroscope according to claim 17, in which said second digital to analog converter can adjust the output of said first digital to analog converter by up to ±50%.

19. The gyroscope according to claim 13, in which said summer further comprises resistive feedback connected and electrically coupled between said summer's input and output to adjust said magnitude of said bias modulation signal in proportion to said output of said first digital to analog converter.

20. The gyroscope according to claim 13, in which said summer further comprises an amplifier with resistive feedback connected and electrically coupled between said amplifier's input and output to adjust said magnitude of said bias modulation signal in proportion to said output of said first digital to analog converter.

21. The gyroscope according to claim 20, in which said resistive feedback can adjust said magnitude of said bias modulation signal to be between ±20 to ±30% of said output of said first digital to analog converter.

22. The gyroscope according to claim 13, in which said first digital to analog converter further comprises resistive feedback connected and electrically coupled between said digital to analog converter's input and output to offset DC bias.

23. The gyroscope according to claim 22, in which said first digital to analog converter further comprises resistive feedback connected and electrically coupled between said digital to analog converter's input and output to offset DC bias to zero volts.

24. The gyroscope according to claim 13, in which said biasing modulator further comprises a resistive input to adjust said magnitude of said bias modulation signal;

said first digital to analog converter further comprises an input op amp stage connected and electrically coupled to said output of said second digital to analog converter, whereby said second digital to analog converter can adjust the output of said first digital to analog converter;

said summer further comprises resistive feedback connected and electrically coupled between said summer's input and output to adjust said magnitude of said bias modulation signal in proportion to said output of said first digital to analog converter; and said first digital to analog converter further comprises resistive feedback connected and electrically coupled between said digital to analog converter's input and output to offset DC bias.

25. A method of stabilizing a closed-loop interferometric fiber optic gyroscope having a phase-rebalance control loop, a gain scaling control loop, and an arbitration logic circuit comprising the steps of:

accumulating phase error within said phase-rebalance control loop during normal operation;

holding said phase-rebalance control loop from accumulating phase error;

applying a phase shift to said closed loop;

accumulating the resultant phase error in said gain scaling control loop;

aligning the gain in the closed loop transfer function of said loop to negate said resultant phase error;

holding said gain scaling from accumulating phase error;

accumulating phase error within said phase-rebalance control loop during normal operation.

26. The method according to claim 25, in which said method of aligning is periodically done at fixed time intervals.

27. The method according to claim 25, further comprising the steps of:

disabling said phase-rebalance control loop from accumulating phase error; and enabling said gain-scaling control loop to accumulate phase error if the gyro rate is below a certain threshold.

28. The method according to claim 27, in which said threshold can be up to about 30°/sec.

29. The method according to claim 27, further comprising the step of enabling said gain-scaling control loop for two Eigen periods.

30. The method according to claim 27, further comprising the steps of:
    disabling said phase-rebalance control loop from accumulating phase error; and
    enabling said gain-scaling control loop to accumulate phase error for one out of every N flybacks if the gyro rate is above a certain threshold.

31. The method of according to claim 30, in which N is an integer from 4 to 16.

32. The method according to claim 30, in which said threshold can be up to about 30°/sec.

33. The method according to claim 27, further comprising the steps of:
    generating an Update signal if the velocity is equal to or greater than a certain threshold;
    generating an Update signal once every N flybacks;
    generating a Hold signal in response to every Update signal to disable said phase-rebalance control loop from accumulating phase error and enable said gain-scaling control loop to accumulate phase error.

34. The method according to claim 33, in which N is an integer from 4 to 16.

35. The method according to claim 33, in which said threshold can be up to about 30°/sec.

36. The method according to claim 33, further comprising the steps of:
    disabling, with said Hold signal, said phase-rebalance control loop from accumulating phase error; and
    enabling, with said Hold signal, said gain-scaling control loop to accumulate phase error for a full modulation period to avoid accumulating a DC bias error.

37. The method of stabilizing a closed-loop interferometric fiber optic gyroscope having a phase-rebalance control loop, a gain scaling control loop, and an arbitration logic circuit comprising the steps of:
    generating a bias voltage used to shift the voltage sampling point out to where the voltage slope is maximized;
    generating a ramp voltage output used to rebalance said loop;
    adjusting said ramp voltage so as to maintain zero phase error during stabilization; and
    multiplexing between said phase rebalance control loop and said gain scaling control loop such that only one of said loops is enabled at any given time.

38. The method according to claim 37, further comprising the step of adjusting said ramp voltage by up to ±50%.

39. The method according to claim 37, further comprising the step of adjusting said magnitude of said bias voltage by up to ±50%.

40. The method according to claim 37, further comprising the step of adjusting said magnitude of said bias voltage in proportion to said ramp voltage.

41. The method according to claim 40, further comprising the step of adjusting said magnitude of said bias voltage to be from ±20% to ±30% of said ramp voltage.

42. The method according to claim 37, further comprising the step of adjusting the DC bias.

43. The method according to claim 42, further comprising the step of adjusting said DC bias voltage in proportion to said ramp voltage.

44. The method according to claim 42, further comprising the step of adjusting the DC bias to zero volts.

45. The method according to claim 39, further comprising the steps of:
    adjusting said ramp voltage by up to ±50%;
    adjusting said magnitude of said bias voltage in proportion to said ramp voltage;
    adjusting the DC bias.

* * * * *